United States Patent
Angot et al.

(10) Patent No.: US 8,406,510 B2
(45) Date of Patent: Mar. 26, 2013

(54) METHODS FOR EVALUATING DISTANCES IN A SCENE AND APPARATUS AND MACHINE READABLE MEDIUM USING THE SAME

(75) Inventors: Ludovic Angot, Hsinchu (TW); Chuan-Chung Chang, Hsinchu (TW); Po-Chang Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 385 days.

(21) Appl. No.: 12/721,508

(22) Filed: Mar. 10, 2010

(65) Prior Publication Data

US 2011/0222734 A1    Sep. 15, 2011

(51) Int. Cl.
G06K 9/00    (2006.01)
G06K 9/36    (2006.01)

(52) U.S. Cl. .......................... 382/154; 382/276

(58) Field of Classification Search .......... 382/106–107, 382/154, 173, 254, 276; 348/273, 247, 449, 348/419, 51, 589
See application file for complete search history.

(56) References Cited

U.S. PATENT DOCUMENTS

| | | | | |
|---|---|---|---|---|
| 5,586,975 A * | 12/1996 | Tanaka et al. | .................... | 604/89 |
| 5,793,900 A | 8/1998 | Nourbakhsh et al. | | |
| 6,141,460 A * | 10/2000 | Amer et al. | .................... | 382/257 |
| 6,157,733 A * | 12/2000 | Swain | .......................... | 382/154 |
| 6,229,959 B1 * | 5/2001 | Suda et al. | ...................... | 396/50 |
| 6,301,385 B1 * | 10/2001 | Chen et al. | .................... | 382/173 |
| 7,302,096 B2 * | 11/2007 | Kim | ............................. | 382/173 |
| 7,639,289 B2 * | 12/2009 | Agrawal et al. | ............... | 348/239 |
| 8,086,060 B1 * | 12/2011 | Gilra et al. | .................... | 382/254 |
| 2004/0076335 A1 * | 4/2004 | Kim | .............................. | 382/257 |
| 2008/0080852 A1 | 4/2008 | Chen et al. | | |

OTHER PUBLICATIONS

Crete et al, The Blur Effect: Perception and Estimation with a New No-Reference Perceptual Blur Metric, SPIE Electronic Imaging Symposium Conf Human Vision and Electronic Imaging, San Jose : États—Unis d'Amérique (2007).*
Subbarao, M.; Gurumoorthy, N.; , "Depth recovery from blurred edges," Computer Vision and Pattern Recognition, 1988. Proceedings CVPR '88., Computer Society Conference on , vol., no., pp. 498-503, Jun. 5-9, 1988.*
Ens, J.; Lawrence, P.; , "An investigation of methods for determining depth from focus," Pattern Analysis and Machine Intelligence, IEEE Transactions on , vol. 15, No. 2, pp. 97-108, Feb. 1993.*
Shang-Hong Lai; Chang-Wu Fu; Shyang Chang; , "A generalized depth estimation algorithm with a single image," Pattern Analysis and Machine Intelligence, IEEE Transactions on , vol. 14, No. 4, pp. 405-411, Apr. 1992.*
Tong et al, Blur Detection for Digital Images Using Wavelet Transform, 2004 IEEE International Conference on Multimedia and Expo ICME IEEE Cat No. 04TH8763 (2004).*

* cited by examiner

Primary Examiner — Andrae S Allison

(57) ABSTRACT

A distance evaluation method for evaluating distances from an observation point to objects within an arbitrary detectable range in a scene is disclosed. The method includes the following steps. First, a focus distance is set to correspond to a lower or higher limit of a chosen detection range. Next, an image is then captured with an image acquisition system, wherein transfer function of the image acquisition system depends on the focus distance. The captured image of the scene is segmented. A blur metric is computed for each image segment of the captured image. The blur metric is associated with the distance of the objects from the observation point in each image segment.

17 Claims, 10 Drawing Sheets

METHODS FOR EVALUATING DISTANCES IN A SCENE AND APPARATUS AND MACHINE READABLE MEDIUM USING THE SAME

BACKGROUND

1. Technical Field

The disclosure relates generally to distance evaluation, and, more particularly to distance evaluation apparatuses and methods for evaluating distances from an observation point to objects in a scene using computer vision, image processing and optic techniques.

2. Background

The need to evaluate distances is a main concern for several fields, such as autonomous robotic navigation, depth map creation, human/machine interaction, surveillance and autofocus systems used in imaging technology.

Conventionally, there are several methods for measuring distances which can be distinguished by the type, active or passive, of the device which utilize the methods. RADAR (RAdio Detection and Ranging) and LIDAR (LIght Detection and Ranging) methods are active devices and methods based on measuring the flight time of electromagnetic waves (radio or light wave) to and from same or different locations to measure distances. Additionally, other active distance measuring methods may utilize the flight time of ultrasonic waves, such as an ultrasonic range-finder. Active distance measuring systems based on light emission (e.g. LIDAR) offer a high degree of precision, however, they are often cumbersome and costly.

Passive distance measuring methods gather surrounding relevant information, often in the form of light waves, and do not emit any signal. Some passive distance measuring methods utilize triangulation techniques from stereoscopic cameras or an arbitrary number of cameras higher than two to create a depth map, containing distance information from a given observation point. Additionally, several passive distance measuring methods have also been proposed which evaluate distances by using several images of a given scene using different camera parameters. Some passive distance measuring systems are based on depth from defocus or depth from focus techniques. They rely on one or a plurality of captured images to evaluate distances. However, when several images must be acquired, the lengthy time required for the capture hinders real time applications, and such system would not be usable for objects and subjects in movement.

It is a subject of the present disclosure to palliate the disadvantages of the previous systems and describe methods and systems allowing distance evaluation for several objects in a scene from a single captured image.

SUMMARY

In an embodiment of a distance evaluation method for evaluating distances from an observation point to objects within an arbitrary detectable range in a scene, a focus distance is set to correspond to a lower or higher limit of a chosen detection range. An image is then captured with an image acquisition system. The captured image of the scene is segmented. A blur metric is computed for each segment of the captured image. The blur metric is associated with the distance of the objects from the observation point in each segment of the captured image.

In another embodiment of a distance evaluation method for evaluating distances from an observation point to objects within an arbitrary detectable range in a scene, a focus distance is set to correspond to a lower or higher limit of a chosen detection range. An image is then captured with an image acquisition system, wherein the transfer function of the image acquisition system depends on the focus distance. The image of the scene is segmented using a selective image enhancement. A blur metric is computed for each segment of the image. The blur metric is associated with the distance of the objects from the observation point in each segment of the captured image.

An embodiment of a distance evaluation apparatus for evaluating distances from an observation point to objects in a scene comprises an image acquisition system, an image processing system and a processing unit. The optical parameters of the lens of the image acquisition system are obtained or known from for example the metadata embedded in the image file. The image processing system segments the image captured by the image acquisition system. The processing unit computes a blur metric for each segment of the captured image, associates the blur metric to the distance of the objects from the observation point in each segment and obtains the depth of each segment.

Distance evaluation methods for evaluating distances from an observation point to objects within an arbitrary detectable range in a scene and apparatuses using the same may take the form of a program code embodied in a tangible media. When the program code is loaded into and executed by a machine, the machine becomes an apparatus for practicing the disclosed method.

BRIEF DESCRIPTION OF THE DRAWINGS

The disclosure will become more fully understood by referring to the following detailed description with reference to the accompanying drawings, wherein.

DETAILED DESCRIPTION OF DISCLOSED EMBODIMENT

An embodiment of the disclosure is described with reference to FIGS. 1 through 9, which generally relate to distance evaluation methods for evaluating distances from an observation point to objects within an arbitrary detectable range in a scene. In the following detailed description, reference is made to the accompanying drawings which form a part thereof, shown by way of illustration of the disclosed embodiments. The embodiments are described in sufficient detail to enable those skilled in the art to practice the disclosure, and it is to be understood that other embodiments may be utilized and that structural, logical and electrical changes may be made, without departing from the spirit and scope of the disclosure. The following detailed description is, therefore, not to be taken in a limiting sense. It should be understood that many of the elements described and illustrated throughout the specification are functional in nature and may be embodied in one or more physical entities or may take other forms beyond those described or depicted.

The distance evaluation method of the disclosure, basically segments an image, with known or unknown optical parameters, taken with a conventional camera or obtained by other means. After the image is segmented, the method of the disclosure evaluates the distance for each image segment. Distance evaluation can be accomplished by measuring the amount of blur for each image segment. The segmentation can be performed with the assistance of a selective image enhancement process, or, if the objects are distinct from one another, be performed with the help of a thresholding, possibly preceded by a background subtraction. The blur evaluation can be related to the camera parameters to provide absolute distance information of the image segments composing the image, or can provide a distance index to construct a relative depth map if the camera parameters are not known.

Figure 1:
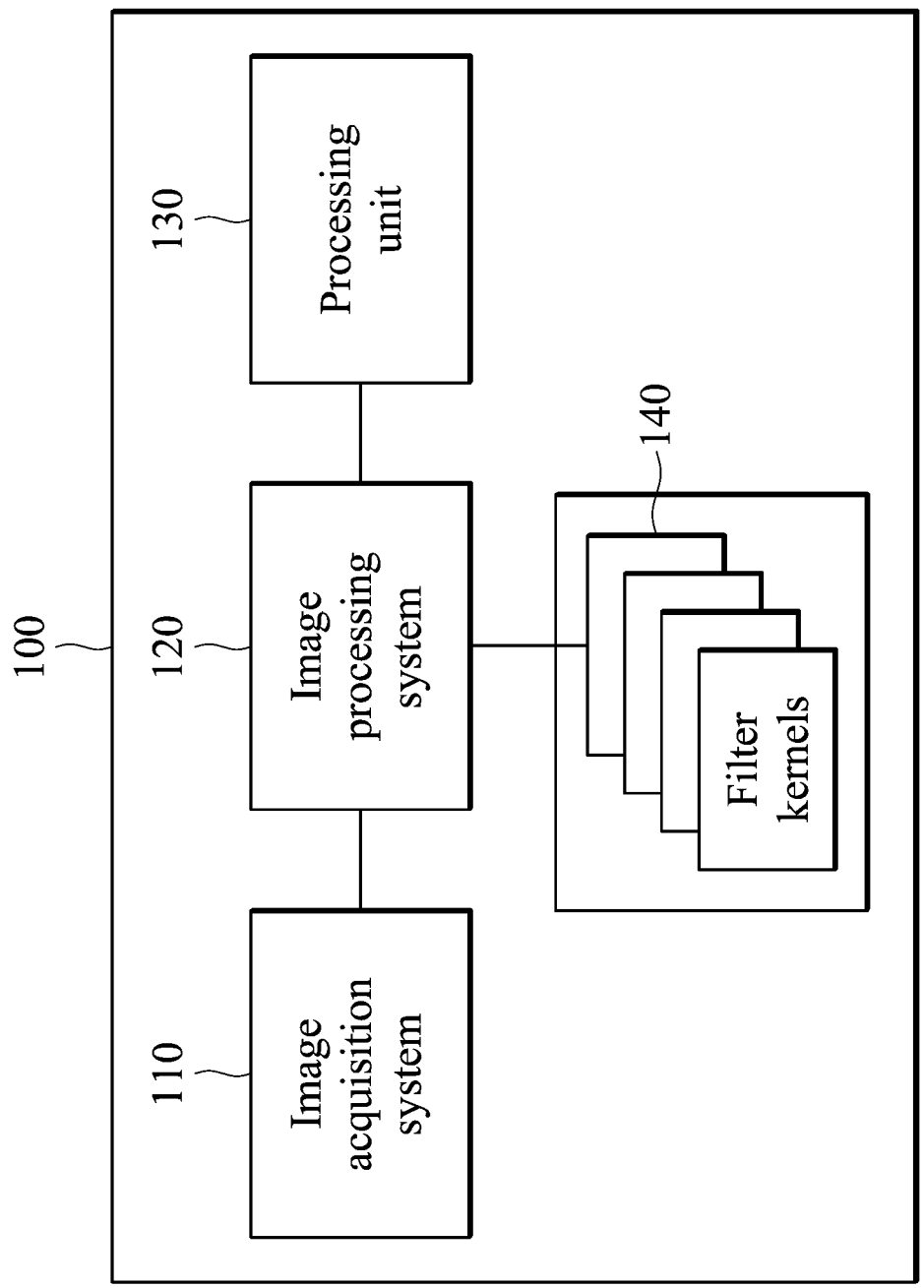
FIG. 1 is a schematic diagram illustrating an embodiment of a distance evaluation apparatus of the disclosure.
Figure 2:
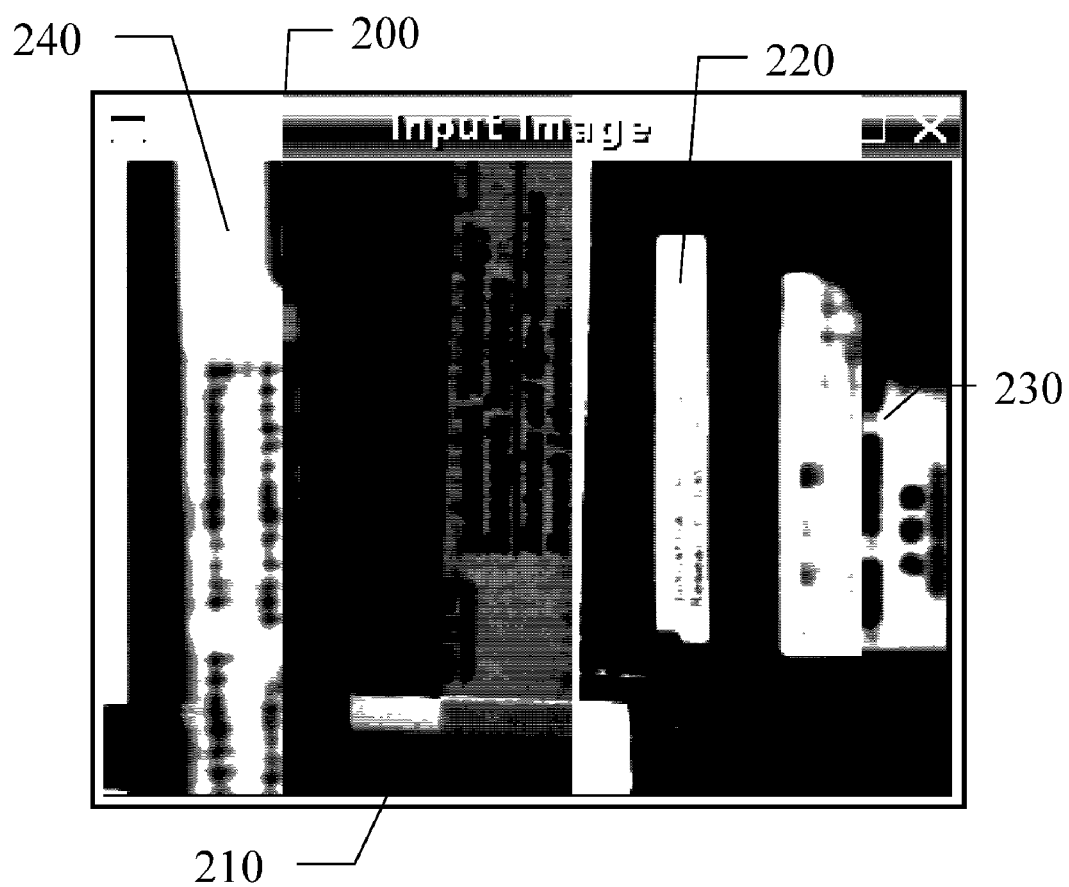
FIG. 2 illustrates an example of an original input image of the disclosure.

FIG. 1 is a schematic diagram illustrating an embodiment of a distance evaluation apparatus 100 of the disclosure. The distance evaluation apparatus 100 is capable of evaluating distances from an observation point to objects in a scene. As shown in FIG. 1, the distance evaluation apparatus 100 at least comprises an image acquisition system 110, an image processing system 120 and a processing unit 130. The image acquisition system 110 may further have a single lens for capturing an image in which the optical parameters of the lens of the image acquisition system 110 such as specification of optical lens (the point spreading function or the optical transfer function, for example) and specification of a sensor (the number of size of pixels, for example), and so on, may be obtained. Note that a captured image may comprise multiple objects and the objects may also be located at different distances. Please refer to FIG. 2, which illustrates an embodiment of an original input image of the disclosure for the following. As shown in FIG. 2, the input image 200 comprises four objects 210-240 and the objects 210-240 are located at different depths D1-D4. As an example, only the object 210 at depth D1 (i.e. the closest distance from an observation point) is in focus.

The image processing system 120 is capable of image segmenting the image captured by the image acquisition system 110. The image processing system 120 may segment the image by utilizing a selective image enhancement process, or, if the objects are distinct from one another, a thresholding technique. For example, in one embodiment, the scene captured may contain distinct objects and the image segmentation may be performed by the following steps: an optional background subtraction with computer vision techniques, a thresholding on a gray scale version of the image or on each or any channel of the image, such as color, hue, intensity, followed by a contour detection in order to obtain individual image segments in the grayscale image or in each color channel of the image. After image has been segmented, the image processing system 120 may generate a plurality of image segments of the captured image. The processing unit 130 is used to calculate a blur metric for each image segment of the image, associate the blur metric to the camera parameters and obtain the depth or distance of each image segment, wherein the blur metric can also be used as an index to provide a relative depth map. Image segmentation methods, calculation of blur metric and methods to associate the blur metric to the camera parameters will be described more detail in the following embodiments.

Figure 3:
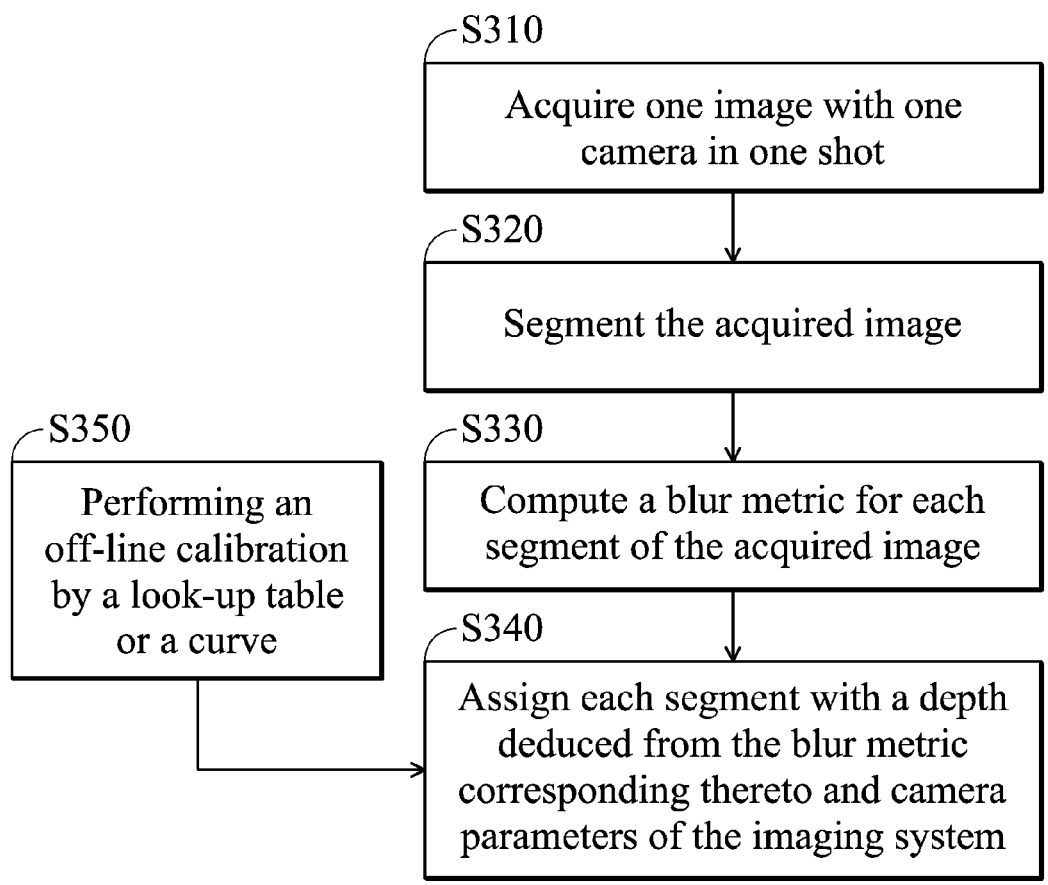
FIG. 3 is a flowchart of an embodiment of a distance evaluation method for evaluating distances from an observation point to objects within an arbitrary detectable range in a scene of the disclosure.

FIG. 3 is a flowchart of an embodiment of a distance evaluation method for evaluating distances from an observation point to objects within an arbitrary detectable range in a scene of the disclosure. The distance evaluation method of the disclosure may be performed by the distance evaluation apparatus 100 shown in FIG. 1. Note that the objects to be imaged, in this embodiment, are located within a given range and the camera lens set at a focus distance corresponding to a lower or higher limit of a chosen detection range. The camera lens may be, for example, made of conventional optical elements or include an additional optical element to produce some form of optical aberration in order to make the blur measurement more sensitive to distance variations. For a conventional optical system, the focus distance may be set to a lower or higher limit of a detection range. The limits are arbitrarily chosen based on either the type of device utilized or based on an evaluation of the detection range of the system described in the disclosure.

As shown in FIG. 3, in step S310, an image with objects located at different distances is acquired in one shot using a single camera of the image acquisition system 110. Note that the focus distance of the camera lens of the image acquisition system 110 is set to a lower or higher limit of a detection range and the transfer function of the image acquisition system 100 depends on the focus distance. In step S320, the image of the scene captured by the image acquisition system 110 is segmented. The image segmentation may be, for example, performed utilizing a selective image enhancement process or a thresholding technique if the objects are distinct from one another. Image segmentation may be performed by the image processing system 120. In one embodiment, if the background of the scene captured is uniform and objects within the scene are distinct, which means there is no overlapping between the objects, image segmentation may be performed by thresholding a gray scale version of the image or each or any color channel of the image, followed by performing a contour detection in order to obtain individual image segments in the grayscale image or in each or in any color channel of the image.

Please refer to FIGS. 5A-5D. FIGS. 5A-5D illustrates examples of a threshold based image segmentations for the original figure shown on FIG. 2. FIG. 5A to 5D illustrate four segmented images for the original image shown on FIG. 2, each of which corresponds to a threshold.

In another embodiment, if a single object has a fixed background within the field of view of the camera, image segmentation may be facilitated by the use of a computer vision technique called background subtraction. Note that such a case will be often encountered in human-machine situations, where, for example, a single user interacts with a computer in a simulated game.

After image segmentation has been completed, in step S330, a blur metric is computed for each image segment by the processing unit 130. The blur metric may be computed by the processing unit 130.

The blur metric may be computed or evaluated according to various methods. One of them is described in the method described in "The Blur Effect: Perception and Estimation with a New No-Reference Perceptual Blur Metric", by F. Crete et al. in SPIE Electronic Imaging Symposium Conf Human Vision and Electronic Imaging, San Jose. One drawback of this method is that it can not be used for an image segment of arbitrary shape isolated from the remaining of the image by a mask; rather, it is suited for rectangular images or subimages or for distinct objects in a uniform and homogenous background. It is an object of the disclosure to modify image segments so that a blur metric can be computed for image segments.

The modification utilizes a morphological operation called dilation in the following way. Masks corresponding to the individual image segments have been obtained. The morphological operation dilation is then applied to each image segment's mask, wherein the operation expands the area of each mask. Each dilated mask is then applied to the original image and each image segment obtained from each dilated mask has also an expanded area. The expanded area allows to evaluate a blur metric as in "The Blur Effect: Perception and Estimation with a New No-Reference Perceptual Blur Metric", by F. Crete et al. in SPIE Electronic Imaging Symposium Conf Human Vision and Electronic Imaging, San Jose.

Another blur metric method suitable for blur evaluation of segments of any shape is based on the evaluation of the spreading of edge of a given object or segment. The method is based on obtaining at least one edge image of the original image, and shifting the edge in each image segment along one direction by a fixed amount of one or more pixels. The shifting can vary for each segment or can be constant.

Figure 4:
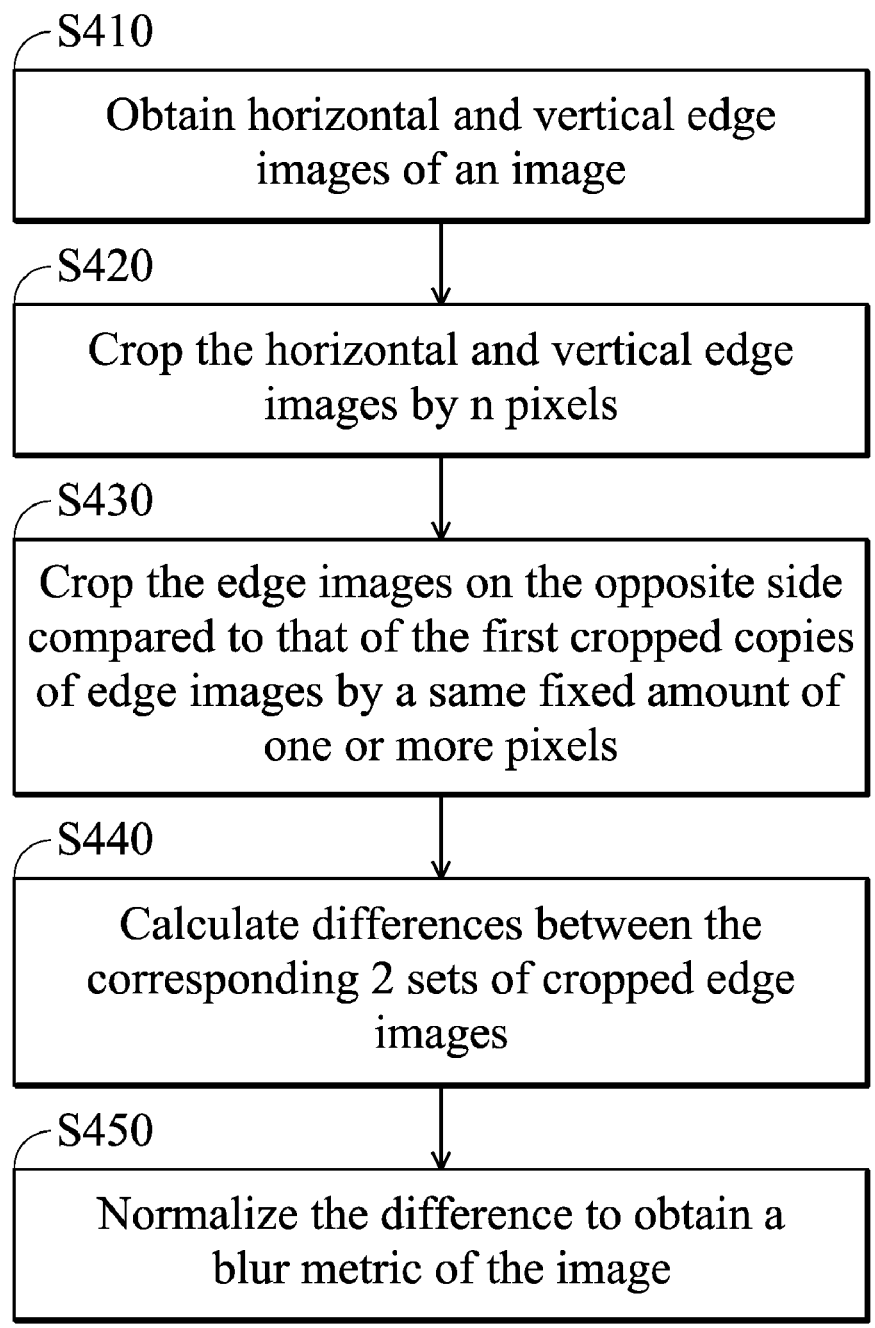
FIG. 4 is a flowchart of an embodiment of a blur metric method based on the evaluation of the spreading of edge of a given object or segment in a scene of the disclosure.
Figure 5A:
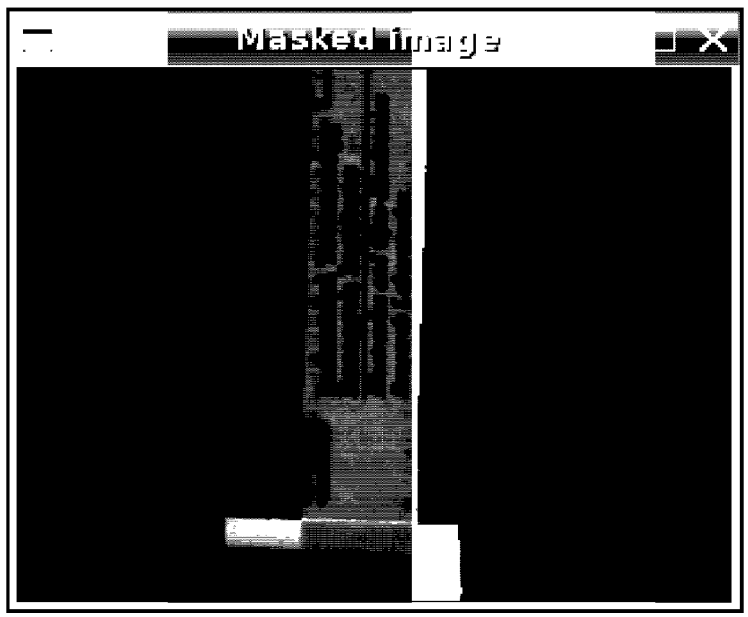
FIGS. 5A-5D illustrate examples of threshold image segmentations for the original figure shown on FIG. 2.
Figure 5B:
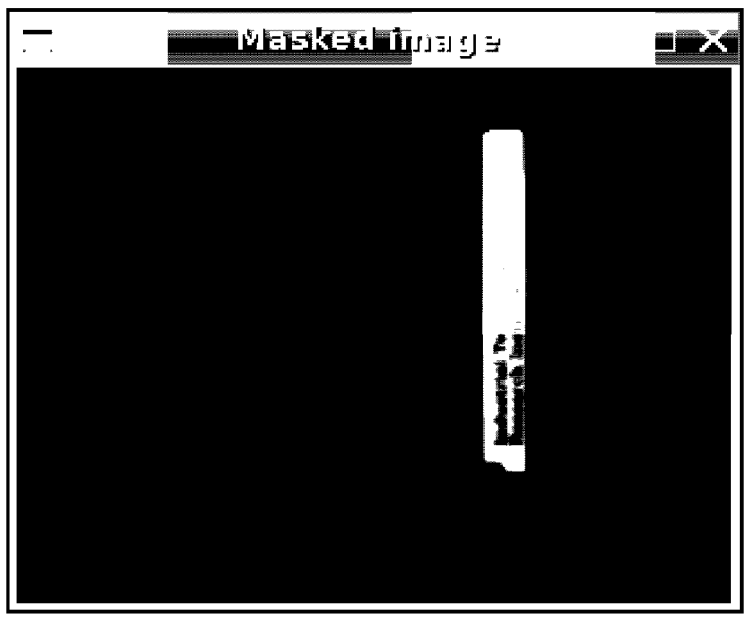
Figure 5C:
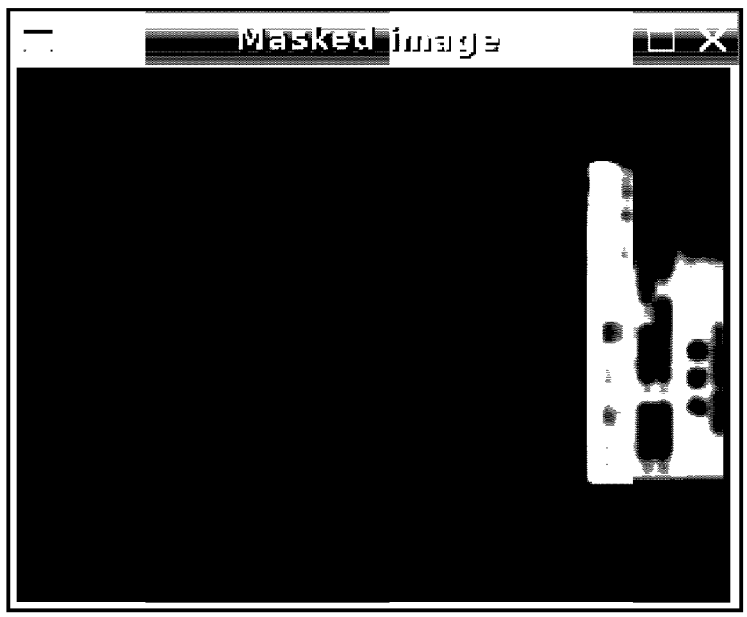
Figure 5D:
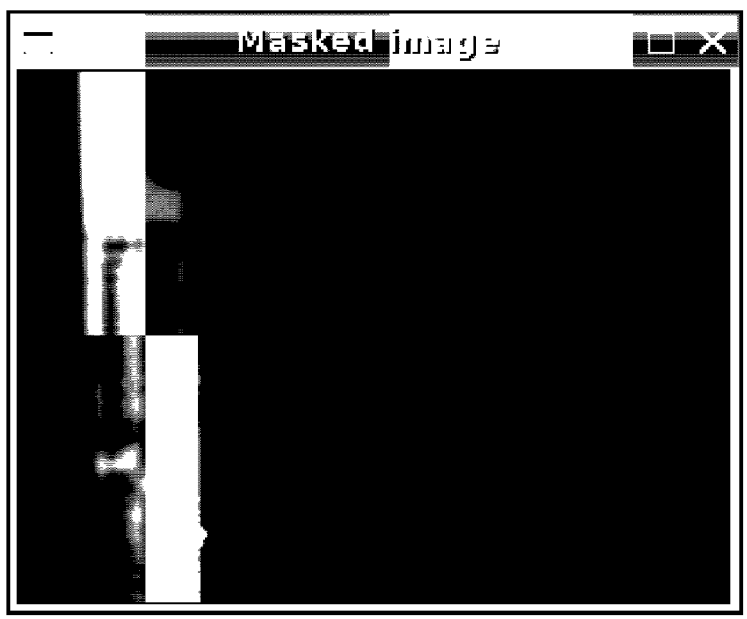

FIG. 4 is a flowchart of an embodiment of a blur metric method based on the evaluation of the spreading of edge of a given object or segment of the disclosure. The blur metric method of the disclosure may be performed by the processing unit 130 of the distance evaluation apparatus 100 shown in FIG. 1. In this embodiment, assume that an original image I with image size W×H is used. As shown in FIG. 4, horizontal edge image HEI and vertical edge image VEI of the image I are first obtained (step S410). Next, a first copy of the edge images HEI and VEI are cropped by n pixels, n≧1 (step S420): cropped on the right or left side for the HEI and on the bottom or top side for the VEI. For example, the horizontal edge image HEI may be cropped to W×(H−n) and the vertical edge image VEI may be cropped to (W−n)×H. Thereafter, other copies of the edge images is cropped on the opposite side compared to that of the first cropped copies of edge images by a same fixed amount of one or more pixels (step S430). For example, the first edge image HEI may be cropped by n pixels down while the first edge image VEI may be cropped by n pixels right, and the second edge image HEI may be cropped by n pixels down while the second edge image VEI may be cropped by n pixels left. Then, the differences between the corresponding 2 sets of cropped edge images are calculated (step S440) and the calculated difference therebetween is normalized to obtain the blur metric of the image segment I (step S450).

The difference between the image of the edge of the original image and of the shifted edge of the original image may provide a metric proportional to the amount of the smearing of the edge, therefore equaling the amount of blur of the edge. The blur metric may also be computed, in another embodiment, based on comparing the intensity, hue, red, green, blue or any channel difference of each of the segments of the original segmented image with a blurred version of each corresponding segment.

Figure 6:
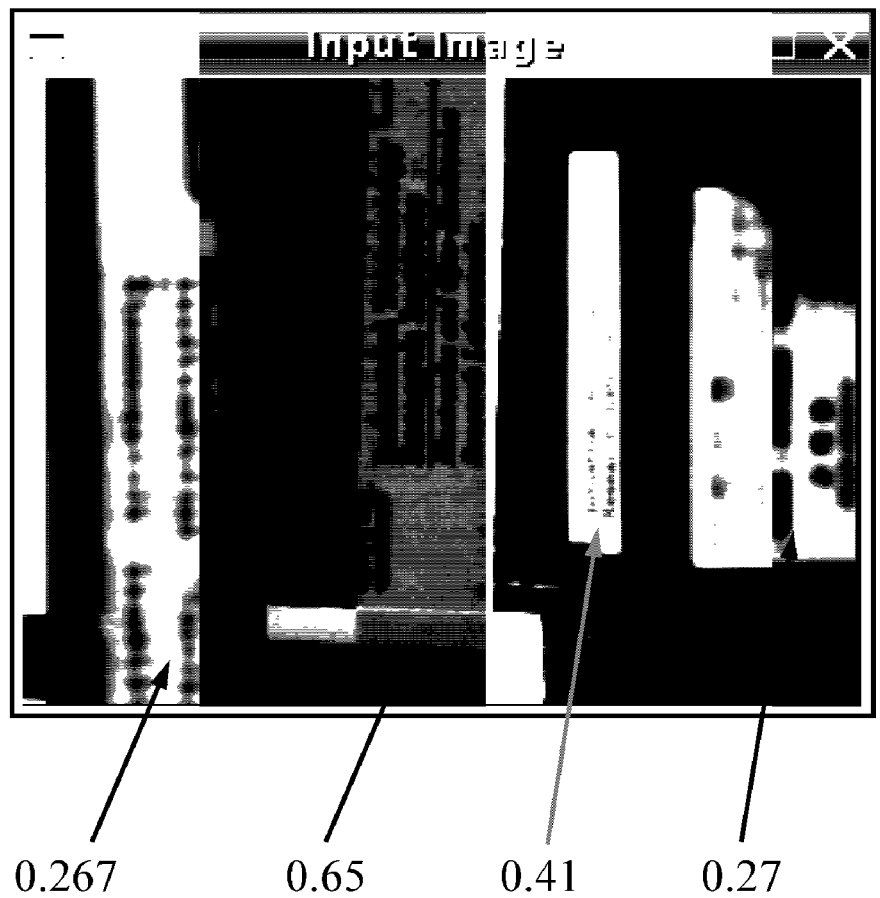
FIG. 6 is schematic diagrams illustrating an embodiment of a result of the edge based blur metric of the disclosure.

Referring to FIG. 6, FIG. 6 is schematic diagrams illustrating an embodiment of a result of the edge based blur metric of the disclosure. In FIG. 6, the numbers indicate the value of the blur metric calculated for each image segment of the FIGS. 5A to 5D respectively. From the numbers, a depth or distance can be assigned to each image segment if only relative distance information is needed.

Referring to FIG. 3, after a blur metric for each image segment has been computed, each image segment is assigned a depth or distance deduced from the blur metric corresponding thereto and camera parameters (step S340). The blur evaluation may be associated with the camera parameters to provide absolute distance information of the image segments composing the image, or may provide a distance index to construct a relative depth map. In one embodiment, for example, the blur metric computed is associated with the camera parameter, according to a calibration curve or look-up table. Also, the size of the blur circle (to which the amount of blur is proportional) is associated with the optical system PSF, and accordingly, the distance to the sensing element of the image acquisition system.

The relationship between the blur metric of a image segment and the distance to the object contained in the image segment can be deduced from the relationship of conventional optical systems:

$$D0=(r \cdot di \cdot f)/(r \cdot di + f(\text{sigma}b - r)),$$

where r is the radius of the lens element of the image acquisition system, di is the distance from the optical center to the sensor plane, sigmab is the size of the blur circle and f is the focal lens of the optics. Detail of this equation can be found, for example, in the reference A New Sense for Depth of Field ALEX PAUL PENTLAND IEEE Transactions on Pattern Analysis and Machine Intelligence archive. Volume 9, Issue 4 (July 1987). Note that sigma_b is not measured directly here but is associated with the blur metric by the use of a proper equation such as the one shown below:

$$\text{Distance} = (\text{Focal} \times \text{sensor\_location})/(\text{sensor\_location} - \text{Focal} - \text{Blur\_circle} \times F\_\text{number}).$$

The relationship between the blur metric and the distance of the object in an image segment may further be deduced from a curve or a look-up table obtained by an off-line calibration step, performed before utilizing the method (step S350).

In another embodiment, image segmentation may also be performed utilizing a series of selective image enhancement processes. For example image segmentation may be performed by using a series of pre-computed filter kernels 140 as shown in FIG. 1, in a fashion similar to the that described in "A multi-depth image restoration based on a quartic phase coded lens" by Ludovic Angot, Po-Chang Chen, Chuan-Chung Chang, COSI 2009, San-Jose. Each filter kernel 140 may be used to reconstruct a portion of the image which would provide a series of images wherein which the objects in focus are segmented and wherein which the segmented object in focus are assigned a depth or distance index related to evaluation of the blur metric in each image segment. It is also assumed that the objects to be imaged are located within a given range.

By using the information from a bank of pre-computed filter kernels 140, each filter kernel 140 may be used to reconstruct and focus in on objects at a given distance. Thus, a series of n filter kernels 140 will provide a series of n images, and within each of the images, only objects corresponding to the distance at which the filter kernel used for selective image enhancement would be in focus. The focused objects may then be isolated from the others by various mean such a high pass filter or other focus based image segmentation techniques. Note that the image must contain regions with a reasonable amount of defocus compared to regions corresponding to the focused objects. The imaging acquisition system (e.g. camera) can easily be setup for such a condition, for example by reducing the F-number of the lens.

Figure 7:
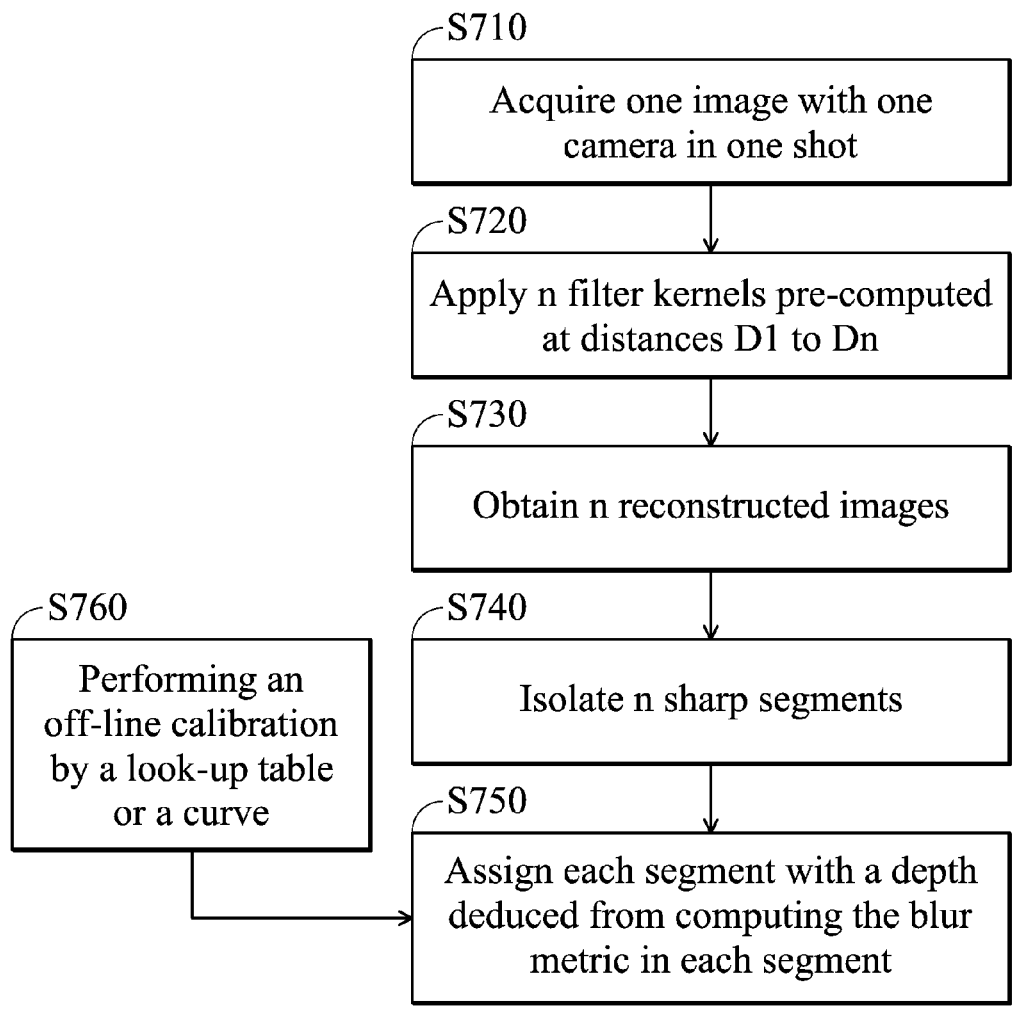
FIG. 7 is a flowchart of another embodiment of a distance evaluation method for evaluating distances from an observation point to objects within an arbitrary detectable range in a scene of the disclosure.

FIG. 7 is a flowchart of another embodiment of a distance evaluation method for evaluating distances from an observation point to objects within an arbitrary detectable range in a scene of the disclosure. The distance evaluation method of the disclosure may be performed by the distance evaluation apparatus 100 shown in FIG. 1.

As shown in FIG. 7, in step S710, an image with objects located at different distances is acquired in one shot using a single camera of the image acquisition system 110. Then, in step S720, a series of n pre-computed filter kernels are applied at distances D1 to Dn to obtain n reconstructed images (step S730). The objects brought into focus in the obtained n reconstructed images may then be isolated to obtain n sharp image segments by using a high pass filter or other focus based image segmentation techniques (step S740). Then, after the n sharp image segments have been obtained, each image segment is assigned a depth or distance deduced from computing the blur metric in each segment (step S750). An absolute distance of the objects in an image segment may further be deduced from a curve or a look-up table obtained by an off-line calibration step, performed before utilizing the method (step S760).

An iterative process or a parallel implementation process segments each object present in the image based on a degree of focus following restoration with each filter kernel. Each object being segmented in such a fashion and thus a mask may then be constructed corresponding to each object. The aforementioned edge based blur metric method may then be applied to the segments of the original image, the later being isolated from the original image by the mean of the masks previously computed.

In one embodiment, the distance evaluation apparatus may further comprise a series of pre-computed selective image enhancement entities such as filter kernels, wherein the image processing system may further perform image segmentation and obtain masks corresponding to the segments, and the segmentation may be obtained by using the series of pre-computed selective image enhancement entities, comprising the steps of isolating a sharp region of the image and obtaining a mask corresponding to said region, applying said mask to the original image to obtain a corresponding segment in the original image and measuring the blur metric in said segment; eliminating previous segmented region and selectively enhancing the remaining region of the image, obtaining a mask from the selectively enhanced portion of the image and applying said mask to the original image to obtain a segment in the original image and measuring the blur metric in said obtained segment; and repeating the previous isolation and elimination steps until the region to be enhanced contains less than an arbitrary amount of pixels or occupies an arbitrary area.

Following illustrates an embodiment of the distance evaluation method for evaluating distances from an observation point to objects within an arbitrary detectable range in a scene according to the disclosure, but the disclosure is not limited thereto.

Figure 8:
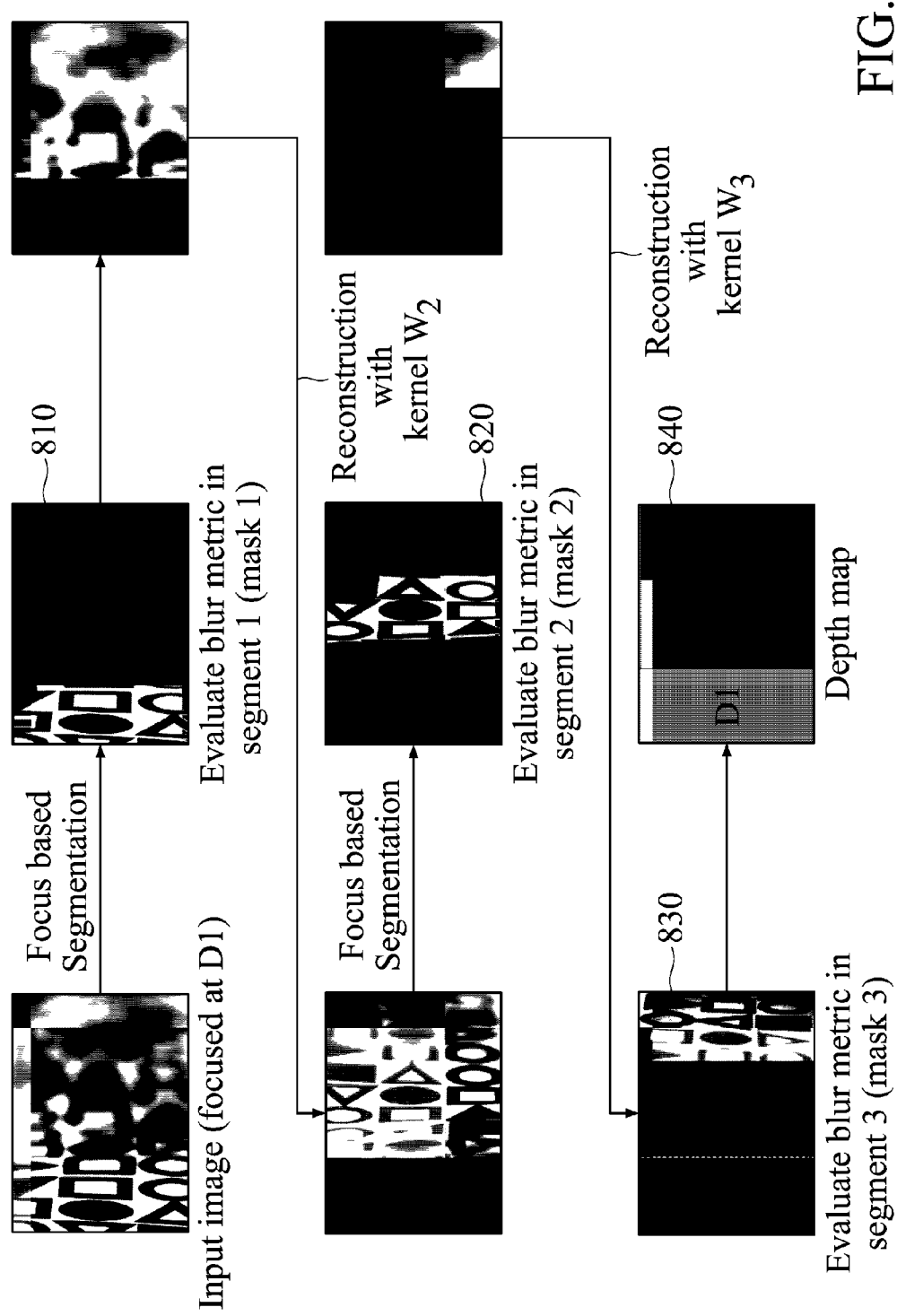
FIG. 8 is a schematic diagram illustrating image segmentation by using a selective image enhancement.

FIG. 8 is a schematic diagram illustrating image segmentation by using a series of selective image enhancements of the disclosure. An example of selective image enhancement is an image restoration, but it is not limited thereto.

As shown in FIG. 8, the lens is focused on the object at the closest distance, D1 (i.e the image segment 810). Then a filter kernel pre-computed to selectively enhance another portion of the image is applied together with segmentation in order to obtain another image segment (i.e. the image segment 820). Successive selective image enhancements are applied to the remaining un-segmented portion of the image followed by segmentation until the un-segmented portion of the image is reduced to an arbitrarily small area (for example containing few pixels). In each segment, a blur metric is computed in order to assign a depth to each segment. A depth map can then be evaluated.

Note that, for simplification, the aforementioned embodiment illustrated in FIG. 8 only evaluates three depths for three image segments according to the three filter kernels, but the disclosure is not limited thereto. In other words, the system may comprise more than three filter kernels and the processing unit may evaluate multiple depths for multiple image segments. Note that, the apparatus may further comprise a means to obtain an image containing an amount of focus and an amount of defocus as same as functions of the aforementioned image acquisition system, such as a reading device from a media on which images have been recorded.

Note that the design of filter kernels is not the technical feature of the present disclosure and can be implemented using prior methods, so details thereof are not described herein.

In another embodiment, the image segmentation may also be performed by the following steps: applying in parallel a set of selective enhancements on the image, each enhancement having a particular parameter; creating segments and masks by isolating each segments corresponding to each selectively enhanced portions of the image; and measuring a blur metric in each segment corresponding to each selectively enhanced portions of the image.

Figure 9:
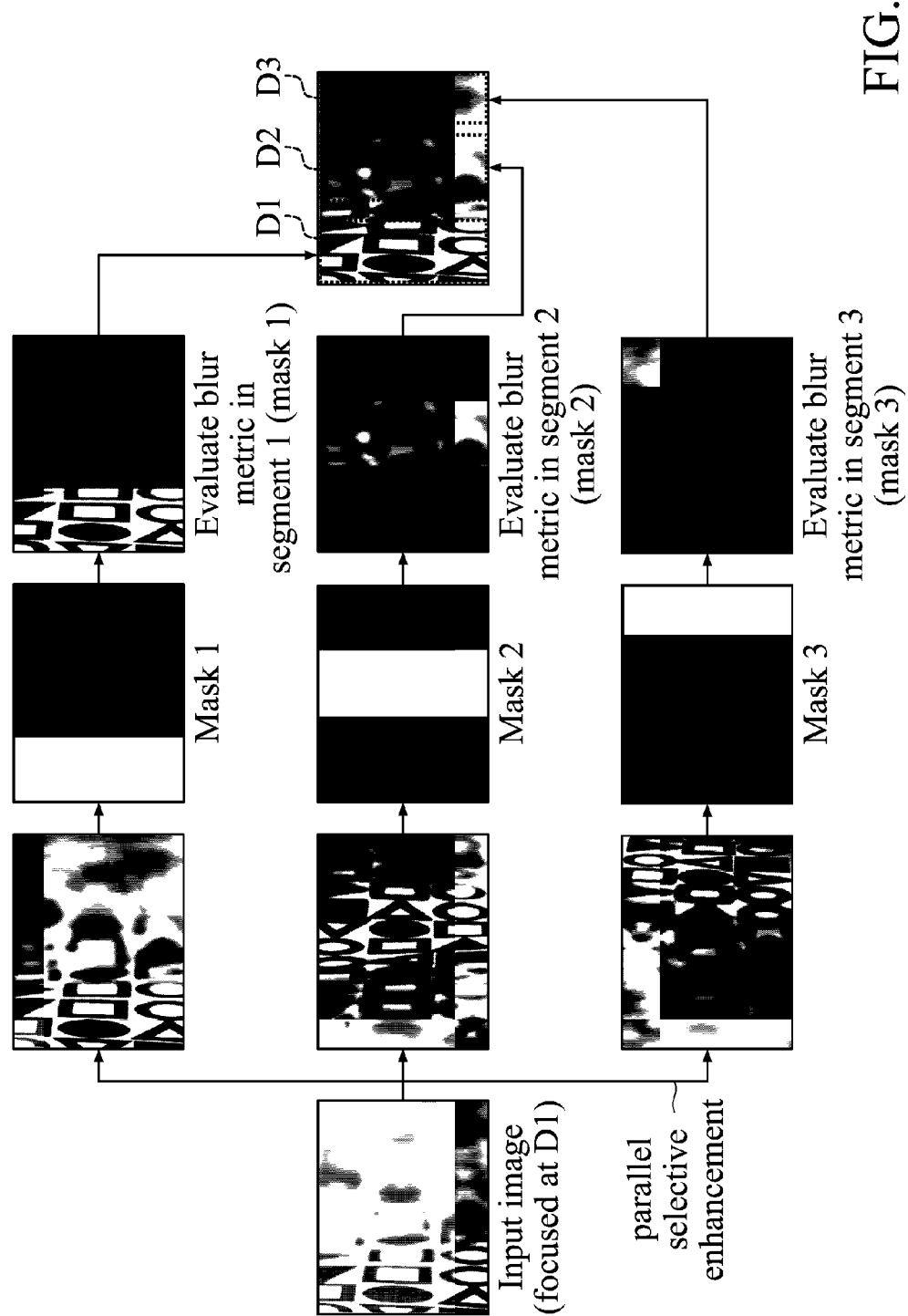
FIG. 9 is a schematic diagram illustrating image segmentation by another utilization of a selective image enhancement.

FIG. 9 is a schematic diagram illustrating image segmentation of the disclosure by using selective image enhancements in parallel. An example of selective image enhancement is an image restoration, but it is not limited thereto.

As shown in FIG. 9, the lens is focused on the object at the closest distance, D1 (i.e the first image segment shown in FIG. 9). Then, a bank of selective image enhancements processes are simultaneously applied to the image in order to first obtain a set of n intermediate images, each one containing a particular portion having been selectively enhanced. The selectively enhanced portion of the image is then segmented and a blur metric is evaluated in each segment, which is in each one of the n images.

Note that, for simplification, the aforementioned embodiment illustrated in FIG. 9 only evaluates three depths for three image segments according to the three filter kernels, but the disclosure is not limited thereto. In other words, the system may comprise more than three filter kernels and the processing unit may evaluate multiple depths for multiple image segments.

Note that the design of filter kernels is not a technical feature of the present disclosure and can be implemented using prior methods, so details thereof are not described herein.

The embodiments of the distance evaluation method and apparatus using the same of the disclosure has the following advantages: (1) simplicity as only one focus setting, one shot, a single lens and a single camera is required along with one image to provide absolute and relative depth information of objects in a scene for passive distance measuring systems; (2) low overall cost due to low complexity computations; (3) ability to discriminate image segments, for passive distance measuring systems, even in the presence of occlusions; (4) images can be selectively enhanced and (5) applicable for conventional cameras.

Apparatuses and methods thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Distance evaluation apparatuses and method disclosed above for evaluating distances from an observation point to objects within an arbitrary detectable range in a scene are provided to reduce computational complexity of the distance evaluation method.

While the disclosure has been described by way of example and in terms of embodiment, it is to be understood that the disclosure is not limited thereto. Those who are skilled in this technology can still make various alterations and modifications without departing from the scope and spirit of this disclosure. Therefore, the scope of the disclosure embodiment shall be defined and protected by the following claims and their equivalents.

What is claimed is:

1. A distance evaluation method for evaluating distances of at least one object within a range in a scene, comprising the steps of:
    capturing an image containing focused and defocused regions with an image acquisition system;
    segmenting the captured image in order to obtain at least one segment;
    computing a blur metric for the at least one image segment of the captured image; and
    relating the blur metric to the distance of the objects from the observation point in the at least on image segment,
    wherein the scene in the captured image contains distinct objects and the image segmentation is performed by the following steps: an optional background subtraction with computer vision techniques, a thresholding on a gray scale version of the image or on each or any channel of the image followed by a contour detection in order to obtain individual image segments in the grayscale image or in each color channel of the image.

2. The distance evaluation method of claim 1, wherein the blur metric is based on the amount of spreading of edges measured at several points of the edge and along a direction perpendicular to the edge at the several points of measure and is applied to the individual segments of the segmented image.

3. The distance evaluation method of claim 1, wherein one or a plurality of masks are obtained from a segmentation and each mask is first processed by a morphological operation called dilation.

4. The distance evaluation method of claim 1, wherein a blur metric is computed based on comparing the intensity, hue, red, green, blue or any channel difference of each of the segments of the original segmented image with a blurred version of each corresponding segment.

5. The distance evaluation method of claim 1, wherein the relationship between the blur metric and the distance of the object in an image segment is deduced from a curve or a look-up table obtained by a calibration step, performed before utilizing the method.

6. A distance evaluation method for evaluating distances of at least one object within a range in a scene, comprising the steps of:
    capturing an image containing focused and defocused regions with an image acquisition system, wherein transfer function of the image acquisition system depends on the focus distance;
    segmenting the captured image with a means of a selective image enhancement in order to obtain at least one image segment;
    computing a blur metric for each image segment of the captured image; and
    relating the blur metric to the distance of the objects from the observation point in each image segment,
    wherein the image segmentation is performed sequentially by the steps consisting of:
    isolating a sharp region of the image, obtaining a mask corresponding to said region and measuring the blur metric in said sharp region;
    eliminating previous isolated sharp region and selectively enhancing a remaining region of the image, obtaining a mask from the selectively enhanced region of the image and measuring the blur metric of said selectively enhanced region of the image; and
    repeating the previous isolation and elimination steps until the region to be enhanced contains less than an arbitrary amount of pixels or occupies an arbitrary area.

7. The distance evaluation method of claim 6, wherein each of the obtained masks is first processed by a morphological operation called dilation.

8. The distance evaluation method of claim 6, wherein a blur metric is based on comparing the intensity, hue, red, green, blue or any channel difference of each of the segments of the original segmented image with a blurred version of each corresponding segments.

9. The distance evaluation method of claim 6, wherein the relationship between the blur metric and the distance of the object in an image segment is deduced from a curve or a look-up table obtained by a calibration step, performed before utilizing the method.

10. The distance evaluation method of claim 6, wherein the image segmentation is performed by the following steps:
    applying in parallel a set of selective enhancements on the image, each enhancement having a particular parameter;
    creating segments and masks by isolating each segments corresponding to each selectively enhanced portions of the image; and
    measuring a blur metric in each segment corresponding to each selectively enhanced portions of the image.

11. A distance evaluation apparatus for evaluating distances of at least one object within a range in a scene, comprising:
    a mean to obtain an image containing an amount of focus and an amount of defocus;
    an image processing system for segmenting an image captured by the image acquisition system in order to obtain at least one segment;
    a processing unit for computing a blur metric for the at least one image segment of the captured image, relating the blur metric to the distance of the at least one object from the observation point in the at least one image segment and obtaining the depth of the at least one image segment; and a series of pre-computed selective image enhancement entities, wherein the image processing system further performs image segmentation and obtains masks corresponding to the segments, and the segmentation is obtained by using the series of pre-computed selective image enhancement entities, comprising the steps of:

isolating a sharp region of the image and obtaining a mask corresponding to said region, applying said mask to the original image to obtain a corresponding segment in the original image and measuring the blur metric in said segment;

eliminating previous segmented region and selectively enhancing a remaining region of the image, obtaining a mask from the selectively enhanced region of the image and applying said mask to the original image to obtain a segment in the original image and measuring the blur metric in said obtained segment; and repeating the previous isolation and elimination steps until the region to be enhanced contains less than an arbitrary amount of pixels or occupies an arbitrary area.

12. The distance evaluation apparatus of claim 11, wherein the scene in the captured image contains distinct objects and the image processing system further performs image segmentation by a thresholding on a gray scale version of the image or on any channel of the image, followed by a contour detection in order to obtain individual segments in the grayscale image or on any channel of the image.

13. The distance evaluation apparatus of claim 11, wherein the processing unit further computes a blur metric in individual segments of arbitrary shapes, segment being obtained from a mask after a morphological operation called dilation.

14. The distance evaluation apparatus of claim 11, wherein the processing unit further computes a blur metric based on the amount of spreading of edges measured at several points of the edge and along a direction perpendicular to the edge in a segment of an image, segment being obtained from a mask after a morphological operation called dilation on the mask.

15. The distance evaluation apparatus of claim 11, wherein the relationship between the blur metric and the distance of the object in an image segment is deduced from a curve or a look-up table obtained by a calibration step, performed before utilizing the method.

16. The distance evaluation apparatus of claim 11, further comprising a series of pre-computed selective image enhancement entities, wherein the image processing system further performs image segmentation and obtains masks corresponding to such segments further comprising the steps of:

simultaneously using the series of pre-computed selective image enhancement entities;

isolating the selectively enhanced region in each selectively enhanced images and obtaining a mask corresponding to said region; and applying the masks corresponding to each selectively enhanced images in order to obtain segments in the original image and measuring the blur metric in said segments of the original image.

17. A non-transitory computer-storage medium comprising a computer program, which, when executed, causes a device to perform a distance evaluation method for evaluating distances from an observation point to objects within an arbitrary detectable range in a scene, wherein the method comprises:

setting a focus distance corresponding to a lower or higher limit of a chosen detection range;

providing a mean to obtain an image containing an amount of focus and an amount of defocus;

segmenting the captured image of the scene with the focus setting;

computing a blur metric for each image segment of the captured image; and relating the blur metric to the distance of the objects from the observation point in each image segment, wherein the scene in the captured image contains distinct objects and the step of segmenting the captured image of the scene with the focus setting is performed by the following steps: an optional background subtraction with computer vision techniques, a thresholdinq on a gray scale version of the image or on each or any channel of the image followed by a contour detection in order to obtain individual image segments in the qrayscale image or in each color channel of the image.

* * * * *